United States Patent [19]

Medford et al.

[11] 4,194,081
[45] Mar. 18, 1980

[54] VACCUM CLEANER HOSE CONSTRUCTION HAVING ELECTRICAL CONDUCTORS EXTENDING THEREALONG AND METHOD OF MAKING SAME

[75] Inventors: Richard D. Medford; Jerry W. Cooper, both of Waynesville, N.C.

[73] Assignee: Dayco Corporation, Dayton, Ohio

[21] Appl. No.: 841,176

[22] Filed: Oct. 11, 1977

[51] Int. Cl.² ............... F16L 11/11; F16L 11/12; A47L 9/24; B29D 23/04

[52] U.S. Cl. ............... 174/47; 138/121; 138/122; 156/244.12; 156/244.13; 156/244.18; 156/257

[58] Field of Search ............... 174/47; 138/103, 121, 138/122; 156/143, 144, 244.12, 244.13, 244.15, 244.18, 257

[56] References Cited

U.S. PATENT DOCUMENTS 3,715,454  2/1973  Kleykamp ............... 174/47
3,725,178  4/1973  Kleykamp et al. ............... 156/244.13 X

FOREIGN PATENT DOCUMENTS 2505144  8/1975  Fed. Rep. of Germany ............... 138/122

Primary Examiner—Laramie E. Askin
Attorney, Agent, or Firm—Charles E. Bricker

[57] ABSTRACT

A vacuum cleaner hose construction having integral electrical conductors and method of making same are provided wherein such hose construction is comprised of a convoluted tube having alternating outwardly convex crests and outwardly concave troughs with a plurality of cutouts being provided in the crests extending completely through the wall thickness thereof and aligned along the length of the tube to define at least one slot construction for receiving the electrical conductors therewithin and a sleeve is disposed around the tube and electrical conductors with the sleeve holding the electrical conductors in position while defining a fluid-tight outer layer for the hose construction.

22 Claims, 8 Drawing Figures

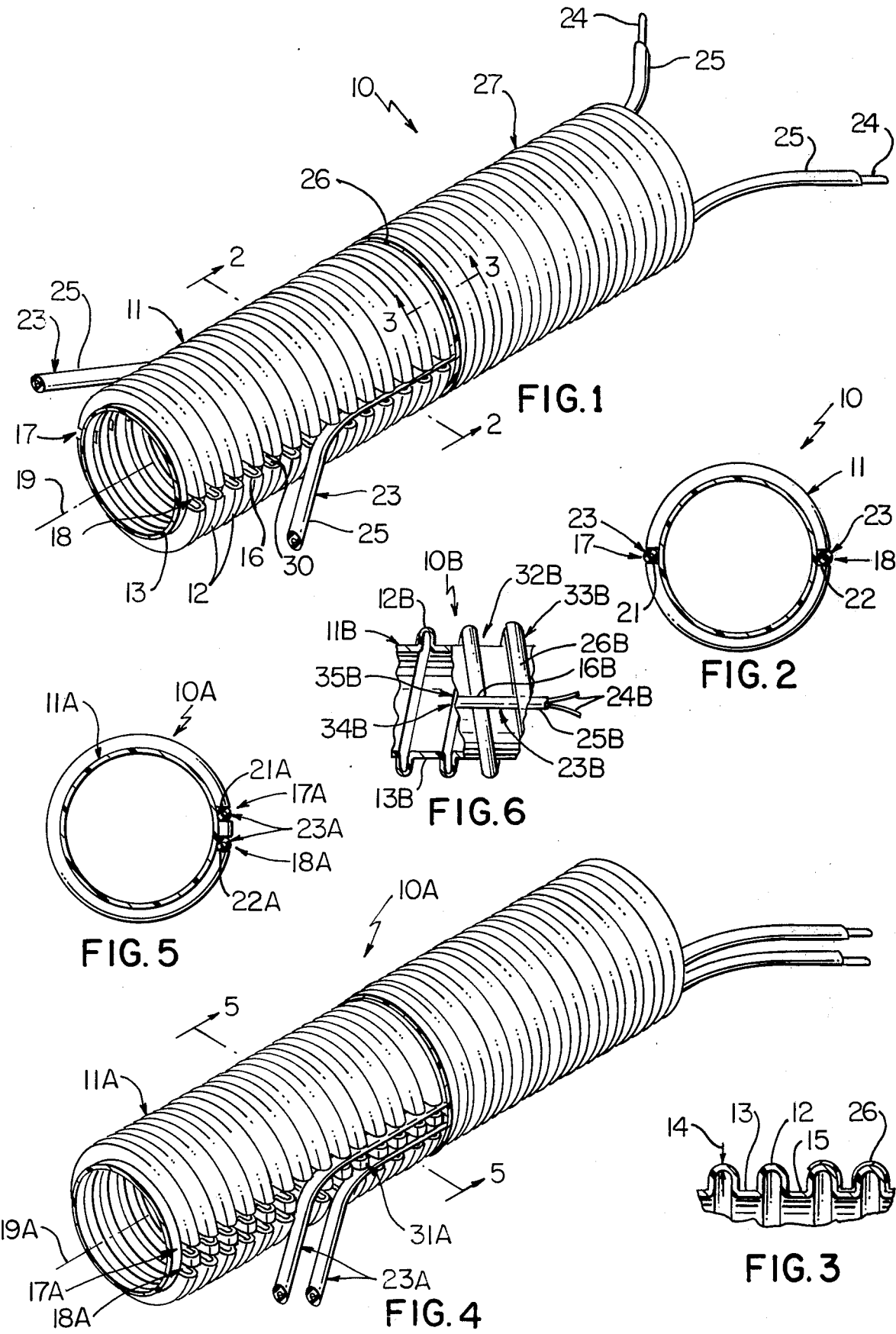

VACCUM CLEANER HOSE CONSTRUCTION HAVING ELECTRICAL CONDUCTORS EXTENDING THEREALONG AND METHOD OF MAKING SAME

BACKGROUND OF THE INVENTION

Tank or canister type vacuum cleaners are widely used throughout industry and many of such vacuum cleaners employ a flexible vacuum hose assembly connected to a tank at one end while having an electric powered cleaning tool, such as a cleaning brush, at the opposite end whereby it is necessary to provide each of such assemblies with a flexible vacuum hose construction having electrical conductors extending therealong for supplying electric power to the cleaning tool.

Because the vacuum cleaner hose industry is a highly competitive one, numerous hose constructions of the character mentioned have been proposed heretofore; however, these previously proposed hose constructions are either generally too expensive for competitive sale or do not have the desired flexibility for most applications.

SUMMARY

It is a feature of this invention to provide a comparatively inexpensive and comparatively highly flexible vacuum cleaner hose construction having electrical conductors extending therealong.

Another feature of this invention is to provide a hose construction of the character mentioned utilizing commercially available manufacturing equipment.

Another feature of this invention is to provide an elongated hose construction of the character mentioned wherein components comprising same are relatively movable along the longitudinal axis of the hose construction to enable easy flexing movements of the hose construction with minimum resistance.

Another feature of this invention is to provide a vacuum cleaner hose construction having integral electrical conductors wherein such hose construction is comprised of a convoluted tube having alternating outwardly convex crests and outwardly concave troughs with a plurality of cutouts being provided in the crests extending completely through the wall and thickness thereof and aligned along the length of the tube to define at least one slot construction for receiving the electrical conductors therewithin; and, a sleeve is disposed around the tube and electrical conductors with the sleeve holding the electrical conductors in position while defining a fluid-tight outer layer for the hose construction.

Another feature of this invention is to provide an improved method of making a vacuum cleaner hose construction of the character mentioned.

Accordingly, it is an object of this invention to provide a vacuum cleaner hose construction and method of making same having one or more of the novel features set forth above or hereinafter shown or described.

Other details, features, objects, uses, and advantages of this invention will become apparent from the embodiments thereof presented in the following specification, claims, and drawings.

BRIEF DESCRIPTION OF THE DRAWINGS

The accompanying drawings show present preferred embodiments of this invention, in which FIG. 1 is a fragmentary perspective view with parts in cross-section and parts broken away illustrating one exemplary embodiment of the hose construction of this invention;

FIG. 2 is a cross-sectional view taken essentially on the line 2—2 of FIG. 1;

FIG. 3 is a cross-sectional view taken essentially on the line 3—3 of FIG. 1;

FIG. 4 is a perspective view similar to FIG. 1 illustrating another exemplary embodiment of the hose construction of this invention;

FIG. 5 is a cross-sectional view taken essentially on the line 5—5 of FIG. 4;

FIG. 6 is a fragmentary view in elevation with parts in cross-section and parts broken away illustrating another exemplary embodiment of the hose construction of this invention;

DETAILED DESCRIPTION

Figure 7:
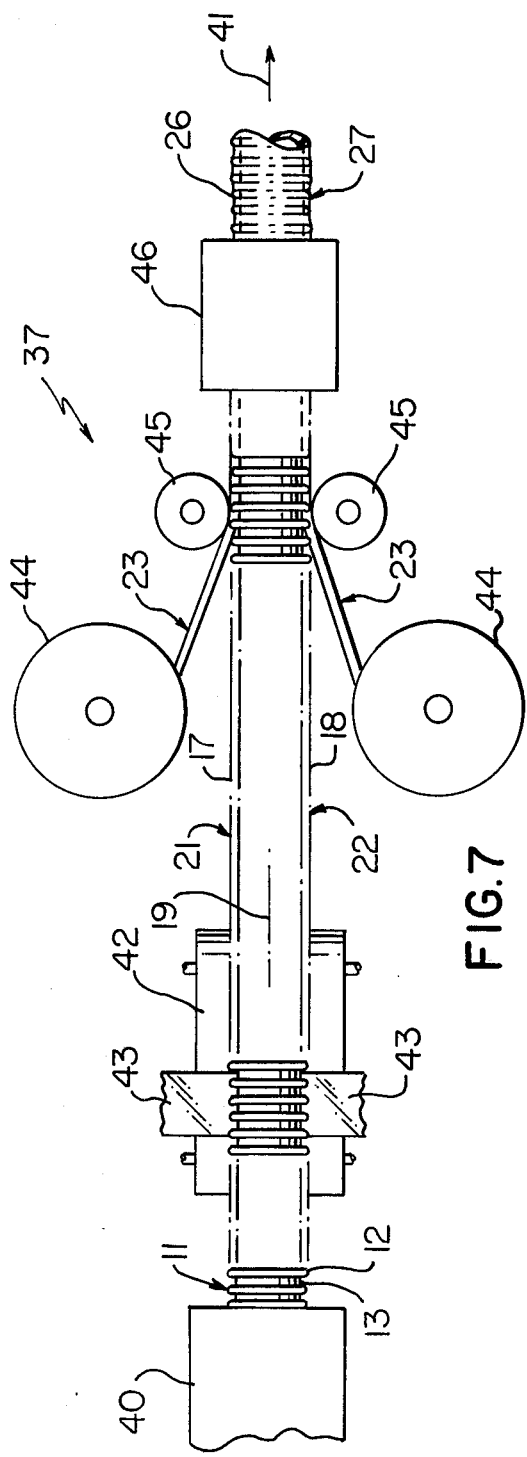
FIG. 7 is a plan view with parts shown schematically and parts broken away illustrating an exemplary embodiment of an apparatus and method which may be employed in making the hose construction of FIG. 1.

Reference is now made to FIG. 1 of the drawings which illustrates one exemplary embodiment of a vacuum cleaner hose construction of this invention having electrical leads extending therealong and such hose construction is designated generally by the reference numeral 10 and is often popularly referred to as an electrical vacuum hose. The hose construction 10 is particularly adapted to be used to define a vacuum hose assembly employed on so-called tank or canister type vacuum cleaners and such hose construction due to the inherent structure thereof employs a minimum amount of structural material which together with the cooperating construction of its components results in such hose construction having optimum flexibility. Further, the minimum amount of material employed to define such hose construction also results in the hose construction being comparatively economical and light in weight.

The hose construction 10 comprises a seamless convoluted tube 11 made of a thermoplastic polymeric material having alternating outwardly convex crests 12 and outwardly concave troughs 13 with the crests having a wall thickness 14 as indicated in FIG. 3 and the troughs having outside surfaces 15 which are cylindrical in shape with the tube 11 in a straight unbent condition. The hose construction 10 has a plurality of cutouts extending completely through the wall thickness of the crests 12 and a representative cutout is designated by the reference numeral 16 in FIG. 1.

The cutouts 16 define a plurality of sets of cutouts and in the example of FIG. 1 the sets of cutouts comprise a plurality of two sets shown as a first set 17 and a second set 18. Each set 17 and 18 of cutouts is aligned along the length of the tube 11 to define an associated slot construction and such slot constructions are designated by the reference numerals 21 and 22 for the sets 17 and 18 respectively. The slot constructions 21 and 22 are disposed in parallel relation along the tube 11 and parallel to a central longitudinal axis 19 of the tube 11 and hose construction 10.

The hose construction 10 also comprises a plurality of flexible members in the form of a plurality of two electrical leads each designated by the same reference numeral 23; and, each electrical lead 23 is disposed in an associated slot construction either 21 or 22 along the tube 11. Each electrical lead 23 is an insulated electrical lead having an electrical conductor 24 covered by an electrical insulating sleeve 25 of any type which is well known in the art. Each electrical conductor 24 may be comprised of a single strand of a suitable electrically conducting wire or of a plurality of comparatively smaller diameter twisted strands as is conventional in the art. Further, the electrical insulating sleeve 25 is preferably made of a suitable thermoplastic polymeric material which is compatible with the material used to define the tube 11.

The hose construction 10 also has a sleeve 26 disposed around the tube 11 and flexible electrical leads 23 and such sleeve 26 is shrunk tightly against said tube and electrical leads to define a convoluted configuration on the outside surface of hose construction 10 and as illustrated at 27 in FIG. 1. The convoluted outer surface 27 corresponds roughly to the convoluted outer surface of the tube 11. The sleeve 26 serves as a fluid-tight outer layer for the hose construction 10 and it will be appreciated that the sleeve 26 assures that the hose construction 10 may serve its function as a vacuum hose without allowing ambient air to seep into the interior of such hose construction 10 and hence into the interior of the tube 11 thereof.

The sets 17 and 18 of cutouts defining the slot constructions 21 and 22 respectively extend completely through the wall thickness 14. Stated otherwise, the cutouts 16 which define sets 17 and 18, in essence, extend through the inner tube 11 defining openings or holes 30 therein which would ordinarily allow passage of ambient air therewithin if the sleeve 26 were not to be present. However, it will be appreciated that the electrical leads 23 provide partial obstruction to such openings 30, and, the sleeve 26 serves to completely seal the openings and hence the interior of the hose construction 10 enabling such hose to operate as a vacuum hose.

The plurality of slot constructions 21 and 22 of the hose construction 10 are disposed substantially 180° apart whereby it will be appreciated that the hose construction 10 may be bent on a diametral line across the hose construction and extending through electrical leads 23 with optimum flexibility.

Other exemplary embodiments of the hose construction of this invention are illustrated in FIGS. 4-5, and 6. The hose constructions illustrated in FIGS. 4-5 and 6 are very similar to the hose construction 10, therefore, such hose constructions will be designated by the reference numerals 10A and 10B respectively and representative parts of each hose construction which are similar to corresponding parts of the hose construction 10 will be designated in the drawings by the same reference numeral as in the hose construction 10 (whether or not such representative parts are mentioned in the specification) followed by the letter designation A and B and not described again in detail. Only those component parts of each hose construction which are substantially different from corresponding parts of the hose construction 10 will be designated by a new reference numeral also followed by an associated letter designation and described in detail.

The hose construction 10A of FIGS. 4 and 5 has cutouts 16A defining sets 17A and 18A of cutouts with the set 17A defining slot construction 21A and the set 18A defining slot construction 22A. The slot constructions 21A and 22A are also disposed in parallel relation and parallel to the central longitudinal axis 19A of the hose construction 10A and the hose construction 10A is such that the slot constructions 21A and 22A are disposed less than 90° apart measured along the circumference of the tube 11A and preferably slot constructions 21A and 22A are generally of the order of less than 10° apart, as shown at 31A. It will be appreciated that with the slot constructions 21A and 22A being disposed on tube 11A as described, the electrical leads 23A will be at corresponding positions on the hose construction 10A. The hose construction 10A with its electrical leads 23A disposed in closely spaced apart parallel relation and parallel to the longitudinal axis 19A is assured of having optimum flexibility.

The hose constructions 10 and 10A employ inner tubes 11 and 11A respectively and each of such tubes has annular crests which alternate with annular troughs whereby the tubes 11 and 11A have what are popularly referred to in the art as annular convolutions. However, the inner tube need not necessarily have annular convolutions but may instead have alternating outwardly convex crests 12B and outwardly concave troughs 13B which are interconnected as is known in the art and as shown in FIG. 6 to thereby define the inner tube as a convoluted tube having a continuous outwardly convex helical convolution extending along its length and such a tube is designated 11B and is shown at 32B in the hose construction 10B. It will also be appreciated that once the sleeve 26B is shrunk in position around the outside surface of the hose construction 10B such hose construction will also have an outwardly convex helical convolution as shown at 33B.

The hose construction 10B also differs from the hose construction 10 and 10A in that instead of having a pair of electrical leads extending in a plurality of cutouts, it has a single electrical lead in a single set 34B of cutouts defined by a plurality of rectilinearly aligned cutouts 16B in the crests 12B. The set 34B of cutouts defines an associated slot construction 35B which is particularly adapted to receive an electrical lead 23B therewithin. However, the electrical lead which is received within the slot construction 35B instead of having a single electrical conductor extending therealong has a pair of electrical conductors 24B and an outer sleeve construction 25B serving as an insulating sleeve for the two electrical conductors 24B and also insulating the electrical conductors 24B from each other.

Thus, it is seen that the hose construction 11B is, in essence, a hose construction having outer helical convolutions and which has a single electrical lead 23B provided with a plurality of two electrical conductors 24B within a single lead.

It will also be appreciated that each of the electrical leads provided at a plurality of two locations in each of the hose constructions 10 and 10A could also be provided with a plurality of electrical conductors in each lead so that each of the hose constructions 10 and 10A could have four or more electrical conductors extending therealong so as to provide electrical power to a plurality of two or more electrical devices, as desired. It will also be appreciated that any desired number of electrical conductors may be provided within any desired number of electrical leads disposed in parallel relation along an associated inner tube in the manner described herein.

Each of the inner tubes 11, 11A, and 11B may be made of any suitable material known in the art and preferably such tubes are made of a suitable polymeric material in the form of a thermoplastic material. One example of a material which may be used in polyethylene.

Each outer sleeve 26, 26A, and 26B may also be made of any suitable polymeric material and preferably each outer sleeve is also made of a thermoplastic material. One material which may be used is polyvinyl chloride.

The sleeves 25, 25A, and 25B provided on the electrical leads 23, 23A, and 23B respectively which are employed on the hose constructions 10, 10A, and 10B respectively may also be made of any suitable electrically insulating polymeric material which is highly flexible. Preferably the material employed in each instance is a flexible material that is compatible with the materials used on the inner tube and the outer sleeve associated therewith.

To assure the hose construction is of optimum economy and flexibility, each of the inner tubes of the hose construction employed in the various embodiments of the hose construction of this invention may be made having a wall thickness generally of the order 0.050 inch for the troughs while having a wall thickness generally of the order of 0.030 inch for the crests thereof. In general, the thickness of the troughs will range between 0.040 and 0.050 inch while the thickness of the crests will range between 0.025 and 0.035 inch. Similarly, each of the outer sleeves comprising the various hose constructions may be made having a wall thickness generally of the order of 0.020 inch. Preferably each of such outer sleeves has a wall thickness ranging between 0.015 and 0.025 inch. These dimensions for the inner tube and outer sleeve of each exemplary hose construction are based in each instance on an inner tube made of polyethylene and an outer sleeve made of polyvinyl chloride.

Each of the hose constructions 10, 10A, and 10B of this invention utilizes one or more electrical leads inserted within a slot construction with a sleeve shrunk in position therearound and inherent in this construction is the fact that there can be relative movement between the inner tube, the one or more electrical leads, and the sleeve through limited increments thereby assuring that in each instance the hose construction may be flexed in an unobstructed manner. Oftentimes the relative movement is a relative sliding movement between the three mentioned components; and, polymeric materials generally used to make these components have such a small coefficient of sliding friction that sliding movement is easily achieved.

Figure 8:
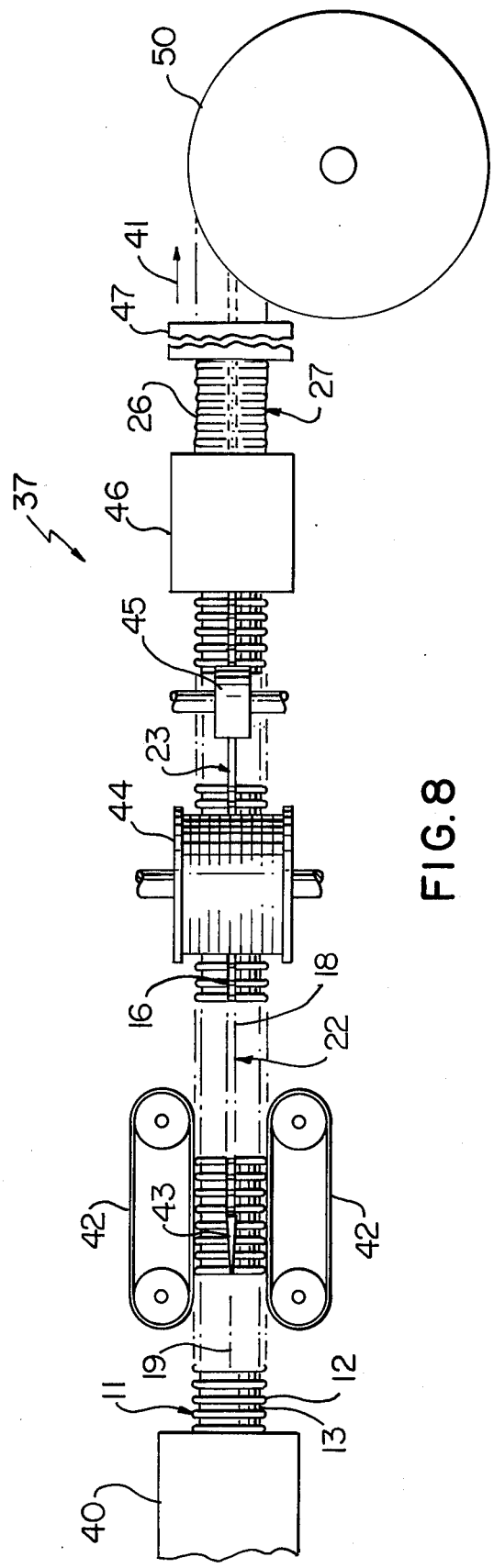
FIG. 8 is a view in elevation of the apparatus and method illustrated in FIG. 7 and illustrating a completed hose construction being rolled on a supply roll thereof.

Having described the polymeric electrical vacuum hose construction of this invention and in particular the various exemplary embodiments thereof presented in the drawings, reference is now made to FIGS. 7 and 8 of such drawings for a presentation of apparatus and method which may be employed to define such hose construction and such apparatus and method is designated generally by the reference numeral 37. The apparatus and method 37 is illustrated in this example as employed in forming the hose construction 10. However, it will be appreciated that similar components and method steps would be employed in forming the hose constructions 10A and 10B with modifications, as required, to define the helical convolutions in the tube 11B and to accommodate the placement of electrical leads as shown for each hose 10A or 10B.

The hose construction 10 is made employing the continuous forming apparatus or method 37 whereby it will be seen that the inner thin-walled tube 11 is continuously formed or made by continuously forming a convoluted polymeric tube 11 having the alternating outwardly convex crests 12 and outwardly concave troughs 13 and this is achieved employing a continuous forming apparatus 40. The apparatus 40 may be of any suitable type known in the art. The forming is achieved so that the crests have a wall thickness 14 as previously described and the troughs have outside surfaces 15 which may be cylindrical surfaces.

The tube 11 after continuous forming thereof in the apparatus 40 is suitably moved in a forming path which is indicated schematically by an arrow designated by the reference numeral 41 and the moving is achieved by a pair of cooperating devices 42 which serve to support and move the tube along the path 41 for forming thereof. While supporting and continuously moving the tube 11 employing the devices 42, the previously described plurality of cutouts 16 are defined therein such that in the hose construction 10 a plurality of two sets 17 and 18 of cutouts are defined to define the respective slot constructions 21 and 22. The cutting is achieved by a pair of diametrically disposed cutters shown schematically as cutting knives 43 and such cutting knives may be of any suitable type such as sharp edged knives, rotary disc-type knives, abrasive discs, or the like. The slot constructions 21 and 22 are defined in parallel relation and parallel to the central longitudinal axis 19 of the tube.

A plurality of two flexible members in the form of electrical leads 23 are provided on associated supply rolls 44 thereof. Each roll 44 is supported for unwinding rotation and each lead 23 is inserted in an associated slot construction. Initially a leading end portion of each lead is placed within its associated slot construction and fixed to the tube 11. Upon continually moving the tube 11 along the forming path each lead 23 is unwound from its associated supply roll and moves therewith. Each lead is inserted in position within its slot construction and such insertion is achieved by a pressing roller 45 which serves to push an associated lead 23 until the inside surface thereof engages the outside surfaces 15 of the troughs 13. The dimensions of the convolutions or crests 12, and each electrical lead 23 are such that the outside surface of each lead 23 is within the circumferential outline of the crests 12. Accordingly, it is seen that the leads 23 are cntinuously inserted in the slot constructions.

After continuously inserting the leads 23 in the slot constructions 21 and 22, the polymeric sleeve 26 is disposed around tube 11 and leads 23 and such disposal is achieved utilizing an extrusion apparatus 46 shown schematically by a rectangular outline. The extrusion apparatus 46 is preferably in the form of a cross-head extruder 46 of known construction which continuously forms sleeve 26 around tube 11 and leads 23 to define the hose construction 10.

The hose construction 10 is then moved to a suitable cooling apparatus 47 or device and device 47 may be of any type known in the art and may employ gas cooling, liquid cooling such as water, or the like. Further, it will be appreciated that upon cooling of the hose construction 10 the sleeve will be shrunk in position defining the convoluted configuration on the outside surface thereof as illustrated at 27. After cooling thereof, the hose construction 10 may be wound on a suitable supply roll 50 thereof or the hose construction 10 may be cut to any desired length for further processing as desired.

In this disclosure of the invention the cutouts 16 extend completely through the wall thickness 14 of the crests 12 of the inner tube 11. However, it will be appreciated that in some applications of this invention the cutouts need not necessarily extend completely through the wall thickness of the crests 12. Further, it is to be understood that the wall thickness of the inner tube may be made of a comparatively thick yet inexpensive and light material and that such thick wall may be sufficiently thick even by providing cutouts 16 therein which do not extend completely through the wall thickness thereof and electrical leads 23 may be inserted into position such that they are still within the peripheral outline such of the crests of the convolutions. Thus, upon forming and disposing a sleeve therearound and shrinking same in position, the resulting hose construction will have substantially the same appearance as the hose construction as shown in FIG. 1.

While present exemplary embodiments of this invention and methods of practicing the same have been illustrated and described, it will be recognized that this invention may be otherwise variously embodied and practiced within the scope of the following claims.

What is claimed is:

1. A vacuum cleaner hose construction comprising, a convoluted polymeric tube having alternating outwardly convex crests and outwardly concave troughs, each of said crests having a wall thickness which defines the entire wall thickness of its associated portion of said tube and said troughs having outside surfaces, a plurality of cutouts in said crests aligned along the length of said tube to define a slot construction, said cutouts extending completely through said entire wall thickness and defining associated openings in said tube, a flexible member disposed in said slot construction along said tube, and a polymeric sleeve disposed around said tube and flexible member, said sleeve holding said flexible member within its slot construction while sealing said openings and defining a fluid-tight outer layer for said hose construction, said slot construction and sleeve enabling said flexible member to be provided in said hose construction economically and with minimum weight yet still maintaining flexibility and a sealed interior in said hose construction.

2. A hose construction as set forth in claim 1 in which said flexible member comprises an insulated electrical lead having a plurality of electrical conductors.

3. A hose construction as set forth in claim 1 in which said flexible member comprises an insulated electrical lead having at least one electrical conductor.

4. A hose construction as set forth in claim 3 in which each of said tube and sleeve is made of a thermoplastic material, said sleeve having a wall thickness which is substantially less than the average wall thickness of said tube.

5. A hose construction as set forth in claim 4 in which said tube is made of polyethylene, said sleeve is made of polyvinyl chloride, and said sleeve has a wall thickness which is roughly one-half the average wall thickness of said tube.

6. A hose construction as set forth in claim 3 in which said crests are annular crests and said troughs are annular troughs thereby defining said tube as a convoluted tube with annular convolutions, and said electrical lead is disposed against said outside surfaces of said troughs.

7. A hose construction as set forth in claim 3 in which said crests are interconnected and said troughs are similarly interconnected thereby defining said tube as a convoluted tube having a continuous outwardly convex helical convolution extending along its length, and said electrical lead is disposed against said outside surfaces of said troughs.

8. A hose construction as set forth in claim 1 in which said cutouts define said slot construction which is disposed along said tube parallel to a central longitudinal axis of said hose construction.

9. A hose construction comprising, a convoluted tube having alternating outwardly convex crests and outwardly concave troughs, each of said crests having a wall thickness which defines the entire wall thickness of its associated portion of said tube and said troughs having outside surfaces, a plurality of cutouts in the wall thickness of said crests defining a plurality of sets of cutouts, said cutouts extending completely through said entire wall thickness and defining associated openings in said tube, said cutouts of each set being aligned along the length of said tube to define an associated slot construction, a plurality of electrical leads each disposed in an associated slot construction along said tube, and a sleeve disposed around said tube and electrical leads, said sleeve being shrunk tightly against said tube to define a convoluted outer surface for said hose construction corresponding roughly to the convoluted outer surface of said tube, said sleeve holding said electrical leads within said slot constructions while sealing said openings and defining a fluid-tight outer layer for said hose construction, said slot constructions and sleeve enabling said electrical leads to be provided in said hose construction economically and with minimum weight yet still maintaining flexibility and a sealed interior in said hose construction.

10. A hose construction as set forth in claim 9 in which each of said electrical leads has at least one electrical conductor provided as a part thereof.

11. A hose construction as set forth in claim 10 in which said plurality of slot constructions are disposed in parallel relation parallel to a central longitudinal axis of said hose construction.

12. A hose construction as set forth in claim 11 in which said plurality of slot constructions comprise two slot constructions disposed substantially 180° apart along the circumference of said tube thereby resulting in said electrical leads being in corresponding positions in said hose construction.

13. A hose construction as set forth in claim 11 in which said plurality of slot constructions comprise two slot constructions disposed less than 90° apart along the circumference of said tube thereby resulting in said electrical leads being at corresponding positions in said hose construction.

14. A method of continuously making a flexible hose construction comprising the steps of, continuously forming convoluted polymeric tube having alternating outwardly convex crests and outwardly concave troughs, each of said crests having a wall thickness which defines the entire wall thickness of its associated portion of said tube and said troughs having outside surfaces, moving said tube in a path to enable further operations to be performed thereon, continuously cutting a plurality of cutouts which extend completely through said entire wall thickness of said crests during movement of said tube in said path to define associated openings and a plurality of sets of cutouts in said tube, said cutouts of each set being aligned along the length of said tube to define an associated slot construction, continuously inserting a plurality of flexible members each in an associated slot construction along said tube during movement thereof in said path, and continuously disposing a polymeric sleeve around said tube and flexible members while shrinking said sleeve tightly thereagainst to define a convoluted outer surface for said hose construction corresponding roughly to the convoluted outer surface of said tube, said sleeve holding said flexible members within said slot constructions while sealing said openings and defining a fluid-tight outer layer for said hose construction, said slot constructions and sleeve enabling said flexible members to be provided in said hose construction economically and with minimum weight yet still maintaining flexibility and a sealed interior in said hose construction.

15. A method as set forth in claim 14 in which said inserting step comprises inserting a plurality of electrical leads.

16. A method as set forth in claim 15 in which said cutting step comprises cutting said cutouts with a plurality of knives.

17. A method as set forth in claim 16 in which said cutting step comprises cutting said plurality of cutouts while supporting said tube in a pair of belt-type holding devices which serve to both support and move said tube.

18. A method as set forth in claim 15 in which said inserting step comprises unwinding each of said electrical leads from a supply roll thereof and pressing each lead into an associated slot.

19. A method as set forth in claim 18 in which said pressing of each lead during said inserting step comprises pressing each lead with an associated roller.

20. A method as set forth in claim 15 in which said disposing step comprises extruding a polymeric sleeve around said tube.

21. A method as set forth in claim 20 in which said extruding step comprises extruding said sleeve with a crosshead extruder.

22. A method as set forth in claim 15 and comprising the further step of cooling said hose construction in a cooling apparatus after extruding said sleeve therearound causing rapid heat shrinking of said sleeve against said tube and electrical leads.

* * * * *